Feb. 4, 1958    J. O. McCAHON ET AL    2,822,003
BOOK FEEDING MECHANISM FOR A BAND SAW
Filed April 12, 1955    14 Sheets-Sheet 1

Inventors
John O. McCahon
Robert G. Proctor
By: Schroeder, Hofgren,
Brady & Weymer
Attorneys

Feb. 4, 1958    J. O. McCAHON ET AL    2,822,003
BOOK FEEDING MECHANISM FOR A BAND SAW
Filed April 12, 1955    14 Sheets-Sheet 3

Inventors:
John O. McCahon
Robert G. Proctor
By Schroeder, Hofgren,
Brady & Wegner
Attorneys Feb. 4, 1958   J. O. McCAHON ET AL   2,822,003
BOOK FEEDING MECHANISM FOR A BAND SAW
Filed April 12, 1955   14 Sheets-Sheet 6

FIG. 8

Inventors:
John O. McCahon
Robert G. Proctor
By: Schroeder, Hofgren,
Brady & Wegner
Attorneys Feb. 4, 1958  J. O. McCAHON ET AL  2,822,003
BOOK FEEDING MECHANISM FOR A BAND SAW
Filed April 12, 1955  14 Sheets-Sheet 8

FIG. 10

Inventors:
John O. McCahon
Robert G. Proctor
By: Schroeder, Hofgren,
Brady & Wegner
Attorneys Feb. 4, 1958     J. O. McCAHON ET AL     2,822,003
BOOK FEEDING MECHANISM FOR A BAND SAW
Filed April 12, 1955     14 Sheets-Sheet 12

Inventors:
John O. McCahon
Robert G. Proctor
By Schroeder, Hofgren,
Brady & Wegner
Attorneys

United States Patent Office 2,822,003
Patented Feb. 4, 1958

2,822,003

BOOK FEEDING MECHANISM FOR A BAND SAW

John O. McCahon and Robert G. Proctor, Crawfordsville, Ind., assignors, by mesne assignments, to R. R. Donnelley & Sons Company, Chicago, Ill., a corporation of Delaware Application April 12, 1955, Serial No. 500,971

10 Claims. (Cl. 143—26)

This invention relates to a book feeding mechanism for a band saw, and in particular it relates to an automatic feeding device which may be mounted on the base of a standard commercial band saw in place of the conventional work table.

In book manufacture it is common practice to arrange the pages in duplicate on the printed sheet. When this sheet is folded, segments of two books are developed one beneath the other in a single long signature. The signatures are grouped in sequence to make up two complete books and remain intact until after the binding operation to reduce the number of individual pieces to be handled. The bound "two-up" or "double book" is sawed in two with a band saw just before the books are trimmed to size.

Insofar as applicants are aware, the sawing of books has ordinarily been done by feeding the double books through the band saw by hand. The present invention is an automatic feed mechanism which takes books from a conventional roller conveyor member, spaces them at equal distances, adjusts the position of the double book laterally with respect to the band saw, conveys the book into contact with the band saw where it is cut in two while being held down by suitable book holding members adjacent the band saw, after which the two books ready for trimming are removed by a carry-off conveyor or belt onto a standard roller conveyor which takes them to the trimmer.

The principal object of the present invention is to provide an automatic feeder for carrying bound double books through a band saw in proper alignment, and properly spaced so that they will be sawed into two parts by the band saw.

A further object of the invention is to provide an infeed mechanism which may take double books spaced at random distances apart and deliver them to a conveyor for travel to a band saw spaced apart substantially identical distances.

Yet another object of the invention is to provide feed mechanism in which the double books are contacted by a friction retard member before they reach the band saw so as to be firmly butted against a pair of lugs on the conveyor chain belts which carry them through the saw.

A further object of the invention is to provide book feeding mechanism which may be mounted upon the frame of a commercial band saw merely by removing the conventional work table from the band saw frame without any alteration of the base or frame.

Another object of the invention is to provide a driven mechanism for firmly holding the books down as they are sawed, and mounting the mechanism so that it may be vertically adjusted to accommodate books of different thicknesses.

The invention is illustrated in a preferred embodiment in the accompanying drawings, in which.

Figure 1:
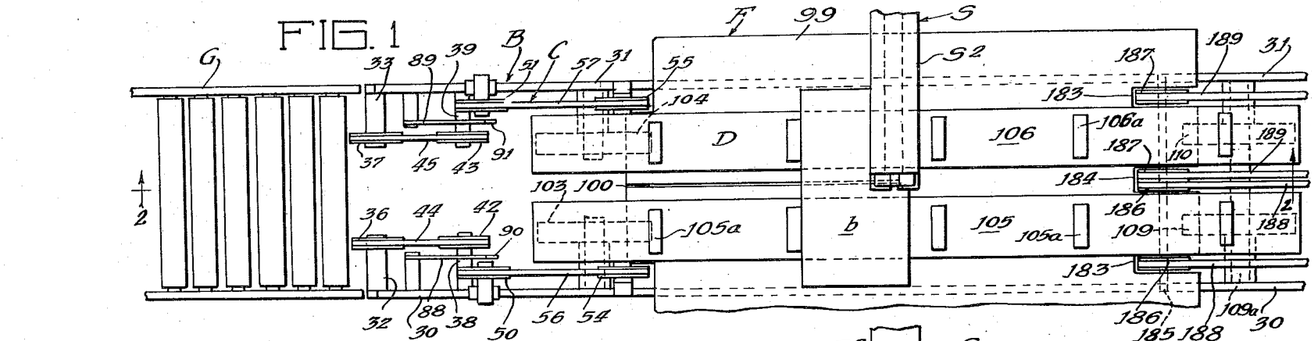
Fig. 1 is a schematic plan view of the book feeding mechanism of the present invention, the book hold-down mechanism being omitted for clarity of illustration.
Figure 2:
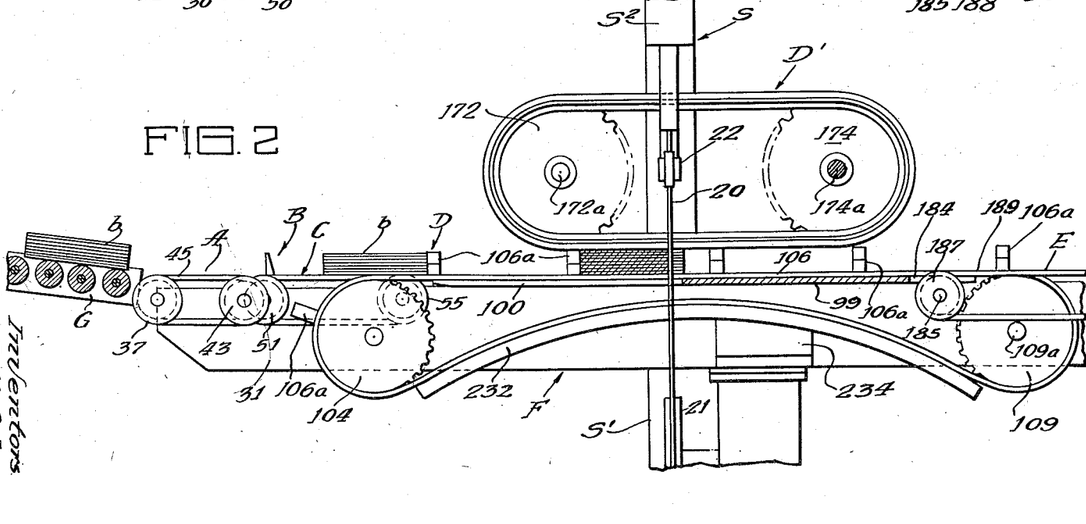
Fig. 2 is a fragmentary schematic sectional view taken as indicated along the line 2—2 of Fig. 1, with the book hold-down mechanism included, but with the book forwarding rollers of the infeed omitted.

Referring to the drawings in greater detail, and referring particularly to Figs. 1 and 2, a band saw, indicated generally at S, has a base S–1 from which the work table has been removed, an overhanging saw head S–2, and a continuous band saw blade 20 which passes around suitable pulleys including a pulley 21 on the base S–1. Depending guide means for the saw blade 20 extends downwardly from the overhanging head S–2, and has rollers 22 at its lower end.

Mounted on the base S–1 of the saw is a frame F which replaces the work table removed from the base. The left hand end of the frame F is adjacent a conventional gravity type roller conveyor G from which double books *b* are picked up by a primary conveyor A which carries the books to a reciprocating stop mechanism B which rocks to permit one double book at a time to be picked up by a forwarding conveyor C which operates at considerably higher speed than the conveyor A (about 25% faster), so as to pull a predetermined space between the book entering the book forwarding feeder and the next book held back by the stop mechanism.

Figure 9:
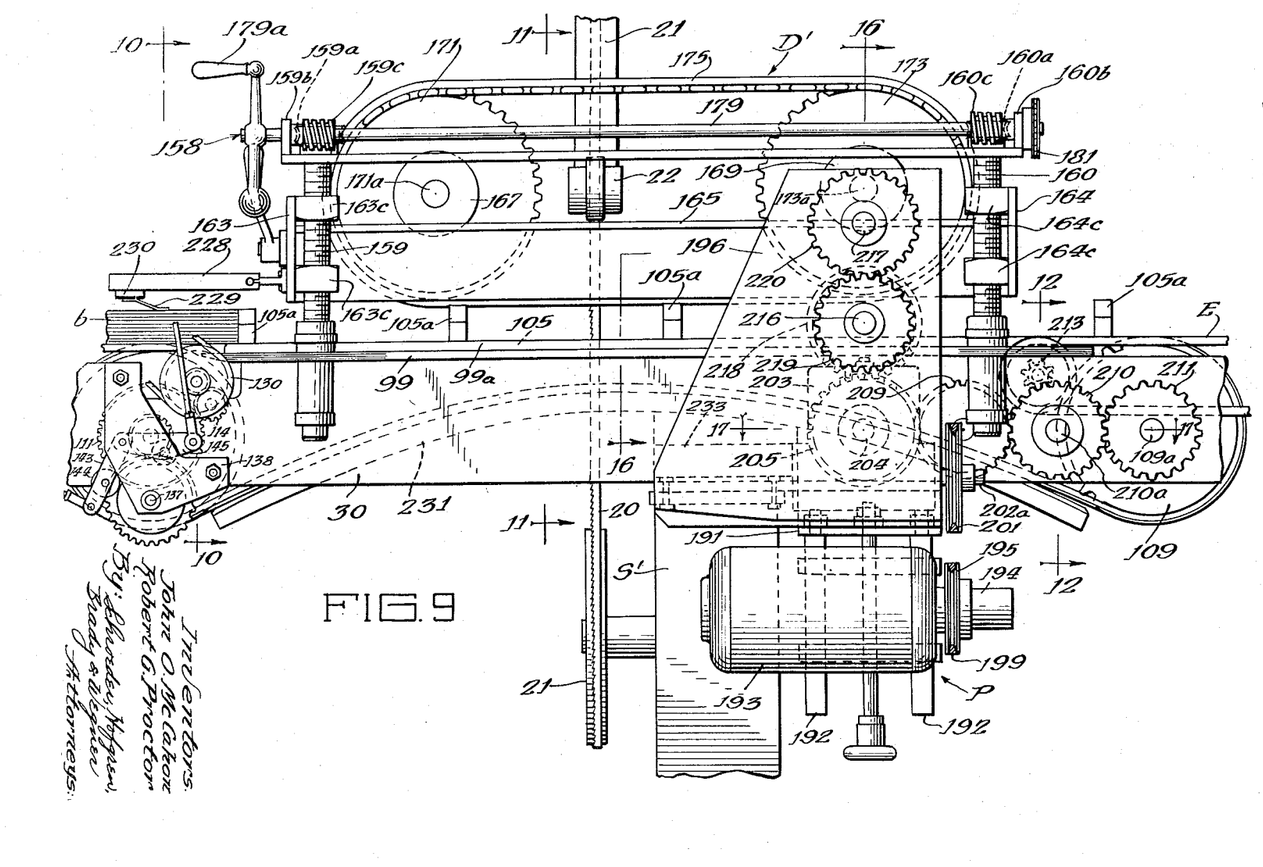
Fig. 9 is a fragmentary side elevational view of the carry-through conveyor, book hold-down mechanism and drive mechanism with parts of the latter omitted for clarity.
Figure 10:
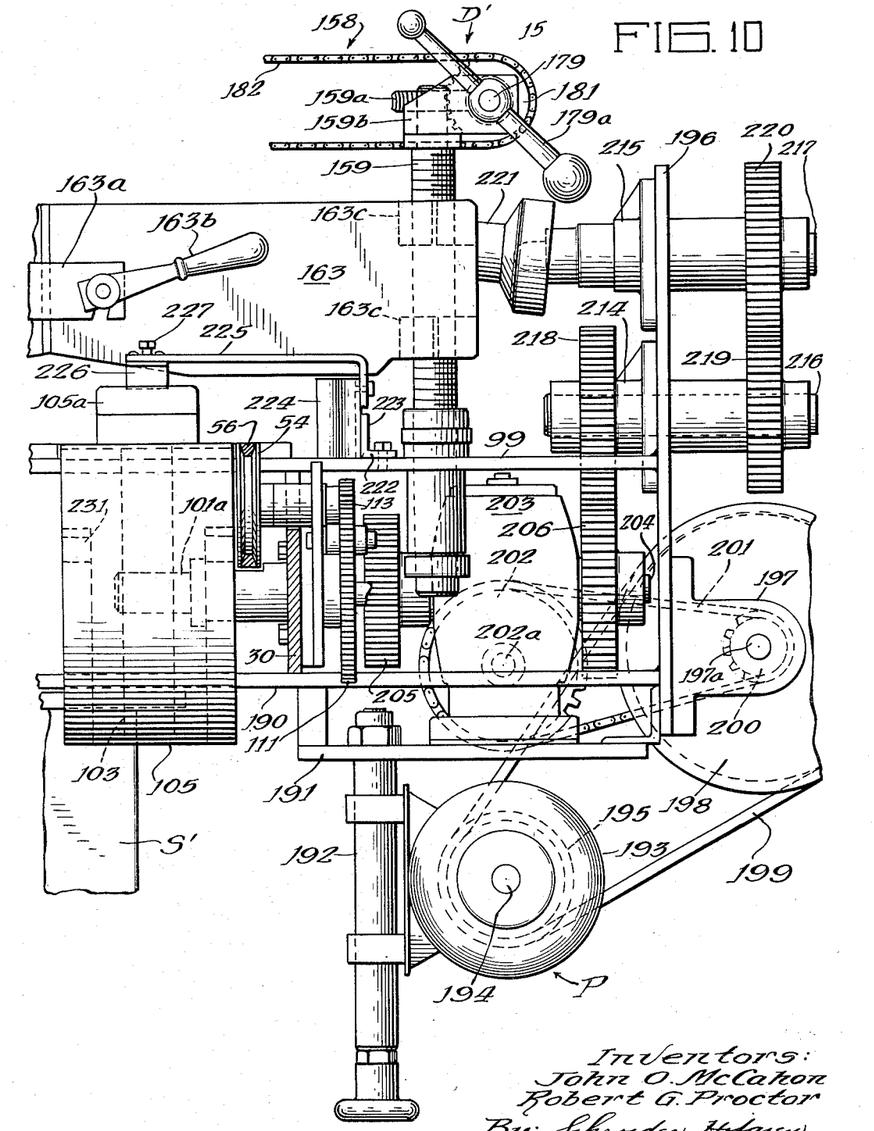
Fig. 10 is a fragmentary sectional view on an enlarged scale, with parts broken away, taken as indicated along the line 10—10 of Fig. 9.

The forwarding conveyor C passes the books to a carry-through unit D upon which the books are carried to the saw to be sawed into two parts, the carry-through mechanism D including a book hold-down mechanism D′ which is vertically adjustable for various size books. The carry-through conveyor mechanism D delivers the two books to a carry-off conveyor E. The entire unit is driven through a power assembly P (Figs. 9 and 10).

Referring now to Figs. 3, 4 and 6 to 8, the frame F includes a pair of longitudinal main supporting beams 30 and 31 which extend the length of the machine and are provided at their infeed ends with transverse hollow bosses 32 and 33, respectively, in which are journalled axially aligned, spaced primary feed drive shafts 34 and 35, respectively, which have pulleys 36 and 37, respectively, at their inner ends. As best seen in Figs. 3 and 6 to 8, mounted on the beams 30 and 31 rearwardly of the bosses 32 and 33, are upright supporting brackets 38 and 39 for inwardly extending spindles 40 and 41 on which are journalled pulleys 42 and 43, respectively, which are aligned, respectively, with the pulleys 36 and 37 to receive primary feed belts 44 and 45.

Figure 3:
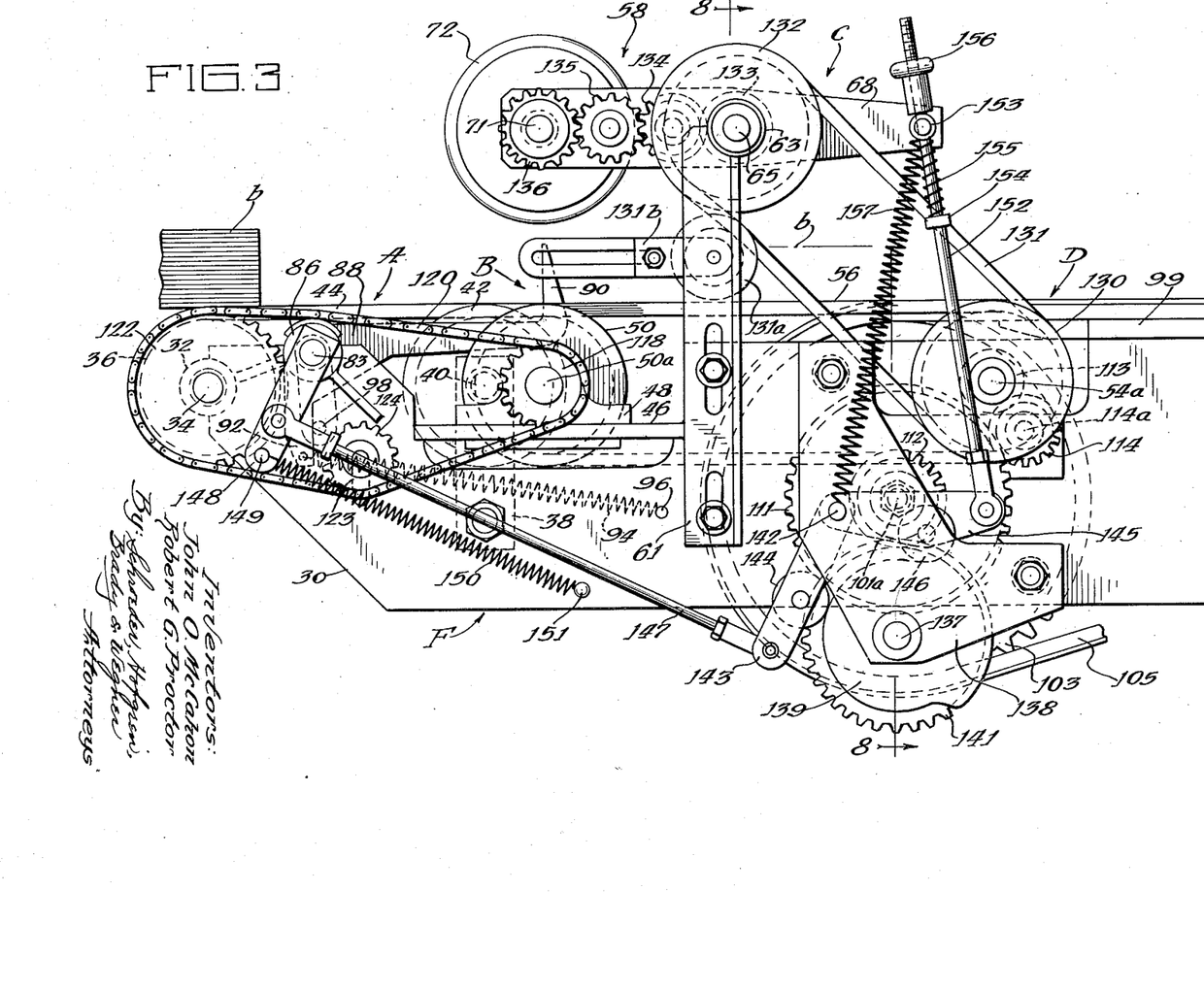
Fig. 3 is a fragmentary side elevational view of the infeed end of the machine.

As seen in Fig. 3, the beams 30 and 31 are recessed adjacent the brackets 38 and 39 to receive longitudinally slotted mounting plates 46 and 47 (Figs. 4, 6 and 7) for longitudinally adjustable pillow blocks 48 and 49 for coaxial book forwarding idler pulleys 50 and 51 keyed on spaced shafts 50a and 51a, respectively; while still further in, flanking the front of the carry-through conveyor D are brackets 52 and 53 having bosses 52a and 53a in which are journalled shaft 54a and 55a for driven book forwarding pulleys 54 and 55 which are longitudinally aligned with the idler book forwarding pulleys 50 and 51 to receive book forwarding belts 56 and 57, respectively.

The forwarding conveyor includes a forwarding roller assembly, indicated generally at 58, which, as best seen in Figs. 3, 6, 7 and 8, is mounted on a pair of laterally projecting supports 59 and 60 which are welded respectively to the beams 30 and 31. Upon the supports 59 and 60 are mounted, respectively, vertically slotted brackets 61 and 62 which may be vertically adjusted with respect to the primary feed belts 44 and 45 and book forwarding belts 56 and 57 to adapt the machine to books of different thicknesses. At the upper ends of the brackets 61 and 62 are integral bearing sleeves 63 and 64 (Fig. 4) in which are mounted rock shafts 65 and 66 which have their inner ends spaced apart and are connected by a collar 67 which is slidable in keyways 65a and 66a so that the collar may be moved to open a space between the two shafts when desired. Keyed on the rock shaft 65, inwardly from the bracket 61, on a supporting sleeve 69 is an elongated rocker arm 68; and at the outer end of the rocker arm 68 is a boss 70 for a shaft 71 on which is mounted a book forwarding roller 72 which is immediately above the idler pulley 50 for the book forwarding belt 56. A second rocker arm 73 has a sleeve 74 by means of which it is keyed on the rock shaft 66, and a boss 75 at the forward end of the rocker arm 73 receives a shaft 76 for a forwarding roller 77 which is positioned above the book forwarding idler pulley 51 and which is connected to the shaft 71 by means of a connecting sleeve 78 which slides in keyways 71a and 76a in the shafts 71 and 76, respectively, so that the sleeve 78 may be slid to one side to open a space between the two shafts, the same way as the sleeve 67 on the shafts 65 and 66.

The rocker arms 68 and 73 may be rocked about their shafts 65 and 66 by a mechanism which will be described in connection with the drive for the infeed components, so that the book forwarding rollers 72 and 77 may intermittently contact books at the stop mechanism B in coordination with movement of the stop mechanism to a release position to move them away from the stop.

Figure 4:
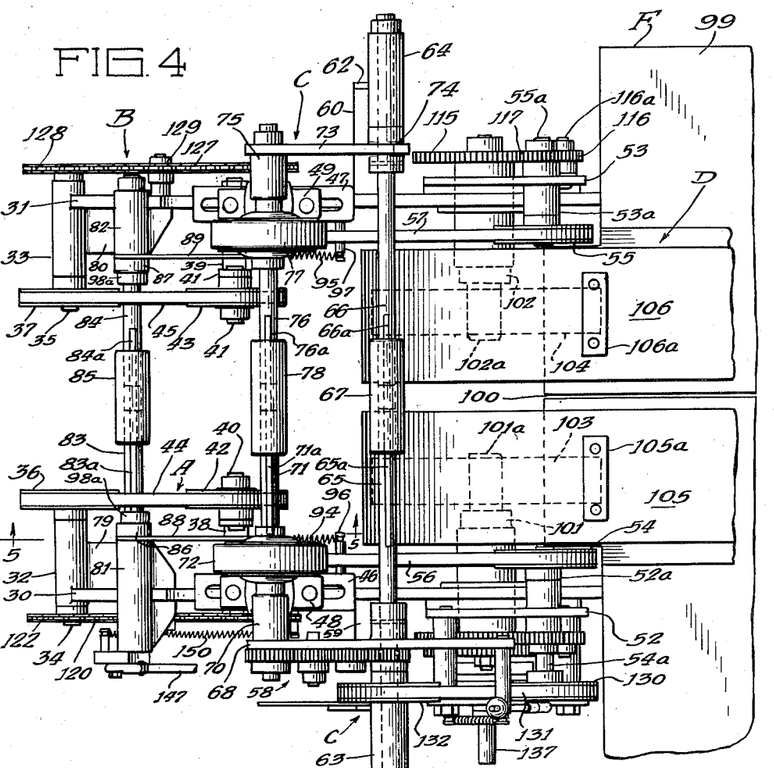
Fig. 4 is a plan view of the infeed end of the machine on a smaller scale than Fig. 3.
Figure 5:
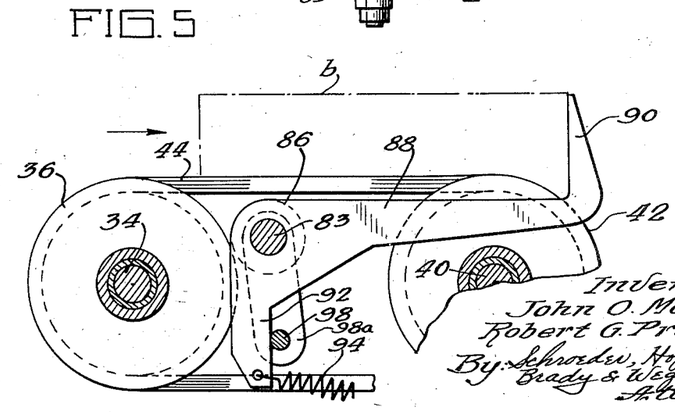
Fig. 5 is an enlarged fragmentary section, taken as indicated along the line 5—5 of Fig. 4 to show the book stop arm of the infeed.
Figure 6:
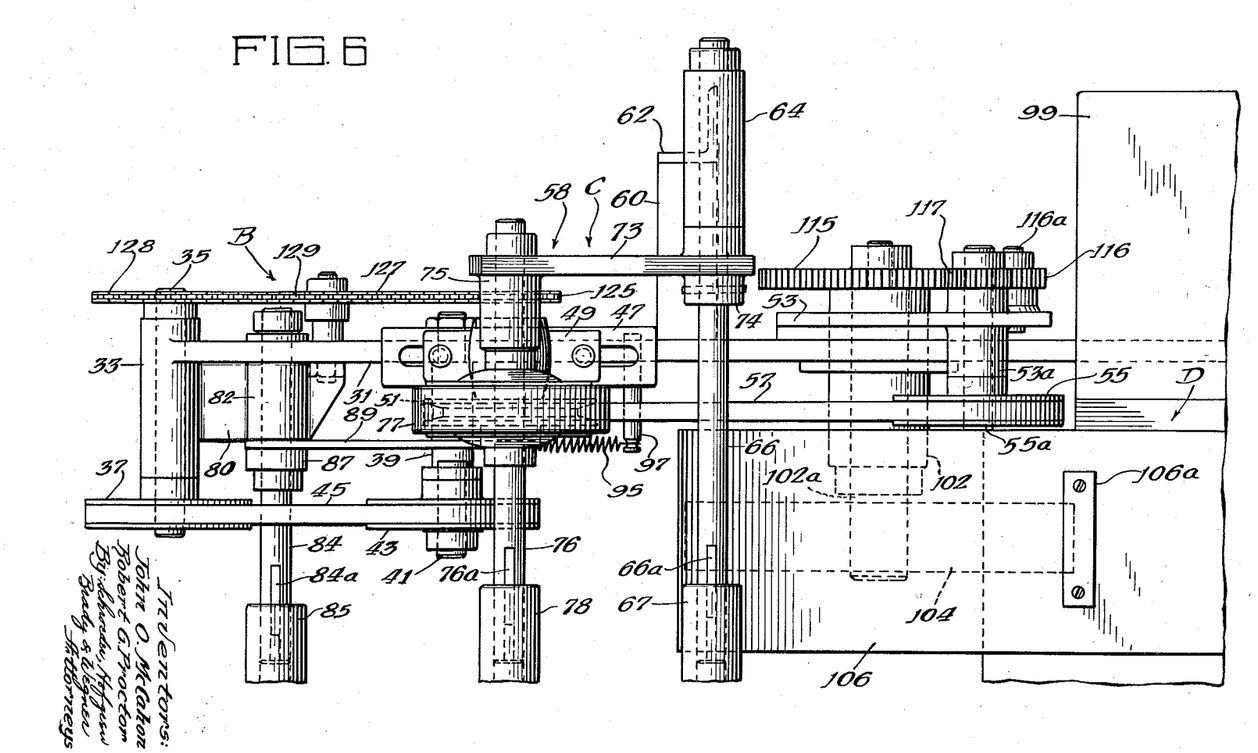
Fig. 6 is a plan view on an enlarged scale of the upper half of Fig. 4 to show one side of the infeed mechanism.
Figure 7:
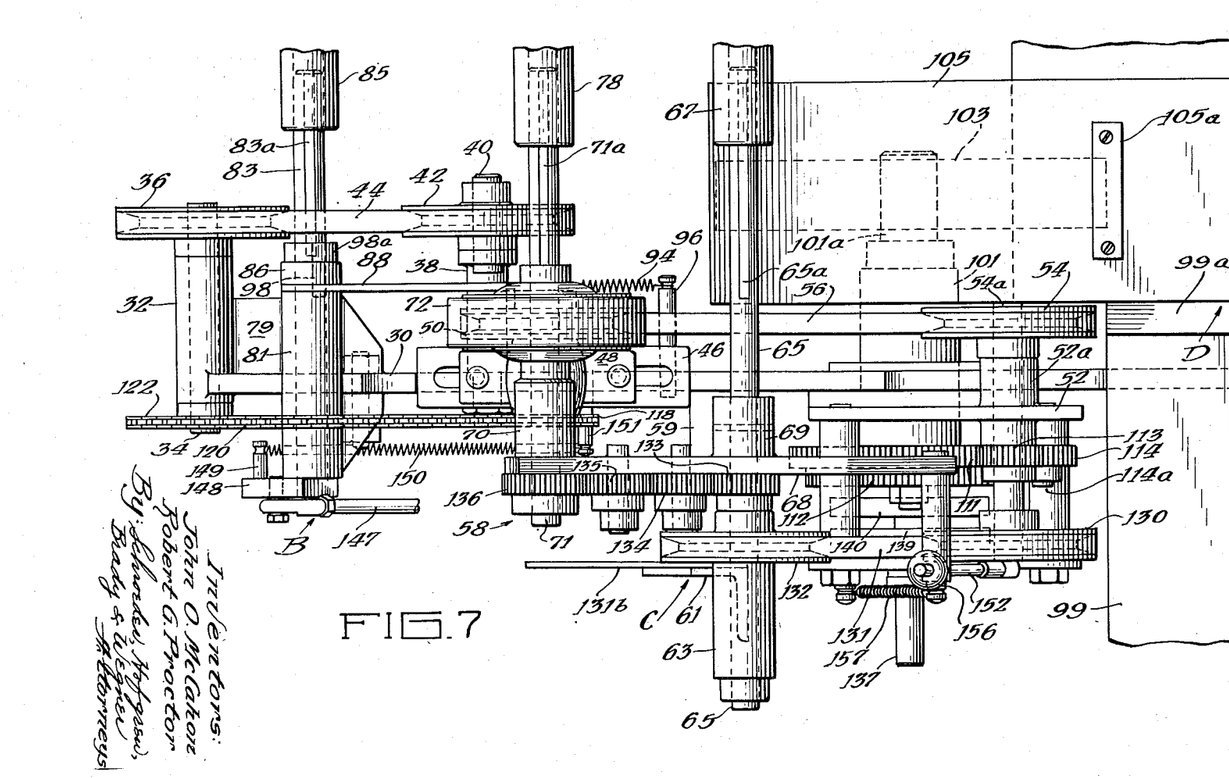
Fig. 7 is a plan view on the same scale as Fig. 6 of the bottom half of Fig. 4 to more clearly show the infeed drive mechanism.
Figure 8:
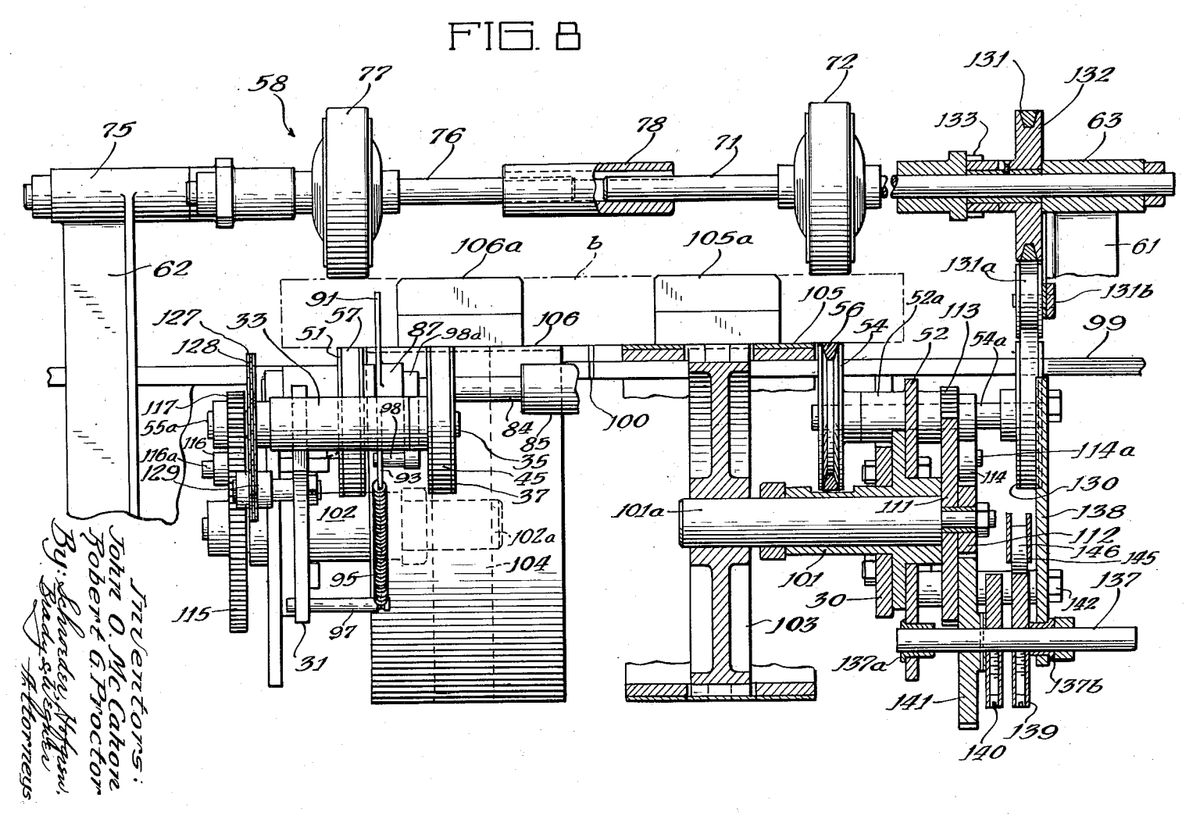
Fig. 8 is a front elevational view from the infeed end of the machine, with the right hand half of the view in section, taken as indicated along the line 8—8 of Fig. 3.

Extending inwardly from the outer ends of the beams 30 and 31, adjacent the bosses 32 and 33, are webs 79 and 80 (see Figs. 4, 6 and 7) which carry bearing members 81 and 82, respectively, for stop shafts 83 and 84, which are connected by a collar 85 slidably mounted in keyways 83a and 84a so that it, like the collars 67 and 68, may be moved longitudinally on the shafts to open a space between them. As best seen in Figs. 4, 5 and 8, mounted on the shafts 83 and 84 are bell cranks 86 and 87 which have stop arms 88 and 89, respectively, extending parallel to the primary book feed belts 44 and 45 and terminating in upstanding stop fingers 90 and 91, respectively, which normally project above the tapes 44 immediately beneath the book forwarding rollers 72 and 77. As best seen in Figs. 4, 6 and 7, the boss 81 is substantially wider than the boss 82, so as to accommodate the extra length of shaft 83 which is necessary for the operating mechanism for the bell cranks 86 and 87, as will be described.

The bell cranks 86 and 87 have downwardly extending spring receiving arms 92 and 93, respectively (see Figs. 5 and 8) to receive tension springs 94 and 95, respectively, which are secured to spring studs 96 and 97 mounted, respectively, in the beams 30 and 31 (see Figs. 4, 6 and 7); so that the stop fingers 90 and 91 are resiliently urged upwardly to the stop positions shown in the drawings. Upward movement of the bell cranks is limited by stop pins 98 mounted on arms 98a which are mounted on shaft 83 for the bell cranks 86.

Turning now to the book carry-through mechanism D; as best seen in Fig. 1, adjacent the pulleys 54 and 55 for the book forwarding belts 56 and 57 is a work table 99 which is provided with a central longitudinal slot 100 to receive the saw blade 20 of the band saw S. It has previously been mentioned that the collars 67, 78 and 85 for the shafts which extend across the infeed mechanism are all slidable to leave a space between the ends of the shaft. This is so that the saw blade 20 may be readily removed through the slot and through the spaces between the ends of the shafts for repair or replacement.

As best seen in Figs. 6, 7 and 8, adjacent the front of the work table 99 and mounted in the beams 30 and 31 are large bearings 101 and 102, respectively, in which are shafts 101a and 102a for fluted idler sprockets 103 and 104 which carry heavy fluted lugged chain belts 105 and 106 of the book carry-through conveyor D. As seen in Figs. 9 and 12, at the opposite end of the work table 99, where the beams 30 and 31 project rearwardly from the table, are large bearings 107 and 108 for a shaft 109a which carries the fluted drive sprockets 109 and 110 for fluted chain belts 105 and 106, respectively. The chain belts 105 and 106 have large book pusher lugs 105a and 106a, and ride on top of the work table 99 on fiber tracks 105b and 106b (Fig. 11) flanking the slot 100 and the saw blade 20. Side guides 99a and 99b on the table flank the chain belts 105 and 106, respectively. Thus, double books may be picked up by the lugs 105a and 106a and carried along the work table 99 riding over the slot 100 so as to be sawed into two parts by the band saw blade 20.

Everything except the book hold-down mechanism D-1 is driven through the shaft 109a upon which the drive sprockets 109 and 110 for the book carry-through mechanism D are mounted; and this drive will now be described.

Referring now particularly to Figs. 3, 6, 7 and 8, the shaft 101a for the idler sprocket 103 of the carry-through conveyor D extends outwardly past the frame member 30 and has a reduced outer end portion to accommodate a drive gear 111 and a drive pinion 112. Mounted on the shaft 54a for the book forwarding drive pulley 54 outside of the mounting plate 52 is a pinion 113, and an idler pinion 114 on a shaft 114a meshes with the gear 111 and with the pinion 113 to drive the pulley 54 from the shaft 101a. This drives the belt 56, and also the book forwarding pulley 50.

A similar arrangement of gears on the shaft 102a for the book carry-through conveyor sprocket 104 drives the pulley 55 and the belt 57. Thus, as seen in Fig. 6 there is a gear 115 on the outer end of the shaft 102a which drives through a gear 116 on a shaft 116a which in turn meshes with a pinion 117 on the shaft 55a for the pulley 55. Thus, operation of the book carry-through conveyor D also operates the book forwarding conveyor belts 56 and 57.

The drive for the belt 44 of the primary infeed mechanism A is best seen in Figs. 3 and 7, and includes a sprocket 118 on the shaft 50a for the book forwarding idler pulley 50 which carries a roller chain 120 which meshes with a sprocket 122 on the shaft 34 for the primary infeed drive pulley 36. A slot 123 in the beam 30 provides an adjustable mounting for a tensioning sprocket 124 for the chain 120. A similar arrangement drives the primary feed belt 45 (see Fig. 6), there being a sprocket 125 on shaft 51a for the book forwarding pulley 51 which carries a roller chain 127 to drive a sprocket 128 on shaft 35 for primary drive pulley 37. An adjusting idler 129 maintains tension in chain 127. The gears and sprockets for driving the primary feeder A off of the book forwarding feed G are so proportioned that the book forwarding feed rotates about 25% faster than the primary feed A. Thus, as a book b is released by the stop fingers 90 and 91 it is pulled rapidly away from the books coming toward the stop fingers 90 on the primary conveyor A. This opens a necessary space between the books so that they may pass seriatim to the saw in spaced relationship with one another.

Referring again to Figs. 3, 7 and 8, the drive for the book forwarding rollers 72 and 77 is from a pulley 130 on the extreme outer end of shaft 54a for book forwarding drive pulley 54 through a belt 131 to a pulley 132 which is journalled on rock shaft 65 outside rocker arm 68. A gear 133 pinned to pulley 132 operates through a train of gears 134 and 135 on the rocker arm 68 to drive a gear 136 on shaft 71 for the book forwarding roller 72, and this drive is carried through the connecting collar 78 and the shaft 76 to the book forwarding roller 77. The book forwarding rollers 72 and 77 are driven at the same speed as the book forwarding belts 56 and 57. Tension in the belt 131 is maintained by a tensioning pulley 131a on a bracket 131b which is mounted for longitudinal sliding movement on the bracket 61.

Figure 15:
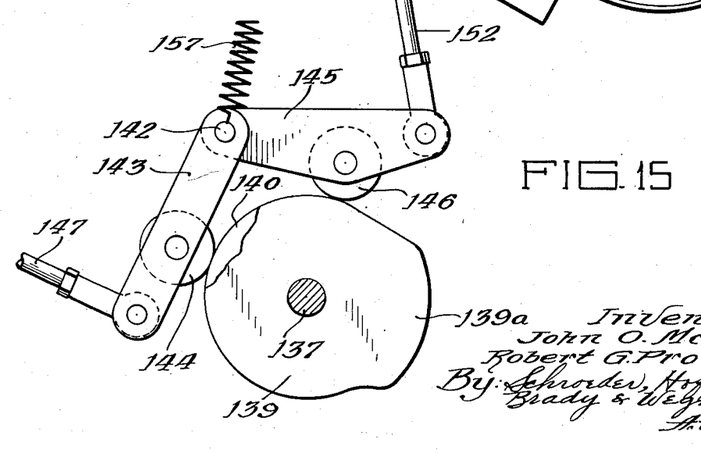
Fig. 15 is an enlarged fragmentary section of a part of the infeed drive mechanism to show the cam and cam follower which move the book stop arms and the book forwarding rollers.

The operating mechanism for the book stop mechanism B and for the rocker arms 68 and 73 is best seen in Figs. 8 and 15, and includes a cam shaft 137 which is journalled between a bushing 137a on the bracket 52 and a bushing 137b on an outside mounting plate 138; and pinned to the cam shaft 137 by means of set screws are two identical cams 139 and 140. A cam shaft gear 141 meshes with the pinion 112 on the outer end of shaft 101a from which the infeed mechanism is driven, to drive the cam shaft.

As best seen in Fig. 15, a cam lever pivot 142 extends between the bracket 52 and the outside mounting plate 138 above and parallel to cam shaft 137; and mounted on the pivot 142 is a stop mechanism cam lever 143 which carries a cam follower 144 to ride on the cam 140. Also pivoted on the shaft 142 is a book forwarding cam lever 145 which has a follower 146 riding upon the cam 139. Extending from the stop cam lever 143 is a link 147 which is connected with an arm 148 (Fig. 3) keyed to the outer and of shaft 83 for the bell cranks 86 and 87, and a pin 149 on the arm 148 accommodates a cam follower spring 150 which is also secured to a pin 151 in the lower part of the beam 30. Thus, follower 144 rides over the surface of cam 139 and when it hits lobe 139a it pushes rocker arm 148 which swings the stop fingers 90 and 91 down to release a book b held by the fingers.

Secured to the book forwarding cam lever 145 is a pushrod 152 which extends through an opening in a pin 153 on the rocker arm 68 and has a spring collar 154 to accommodate a compression spring 155 the tension of which may be adjusted by means of an adjusting nut 156. Also secured to the pin 153 and to the cam lever shaft 142 is a cam follower spring 157 which urges the rocker arm 68 downwardly and thus urges the cam follower 146 into engagement with the cam 140. Thus, when the follower 146 rides onto the lobe of the cam 140, it elevates the push rod 152 and swings the rock shafts 65—66 to move the book forwarding rollers 72 and 77 downwardly into contact with a double book which has just been released by the downward rocking movement of the stop fingers 90 and 91. The relative positions of the cams 139 and 140 is adjusted so that the location of the lobes gives the proper timing for the movement of the stop fingers 90 and 91 and the book forwarding rollers 72 and 77. The compression spring 155 on the push rod 152 makes it possible to adjust the book forwarding rollers 72 and 77 to slight variations in the thickness of the books passing beneath them which results from the fact that the paper varies in thickness throughout a lot.

Figure 11:
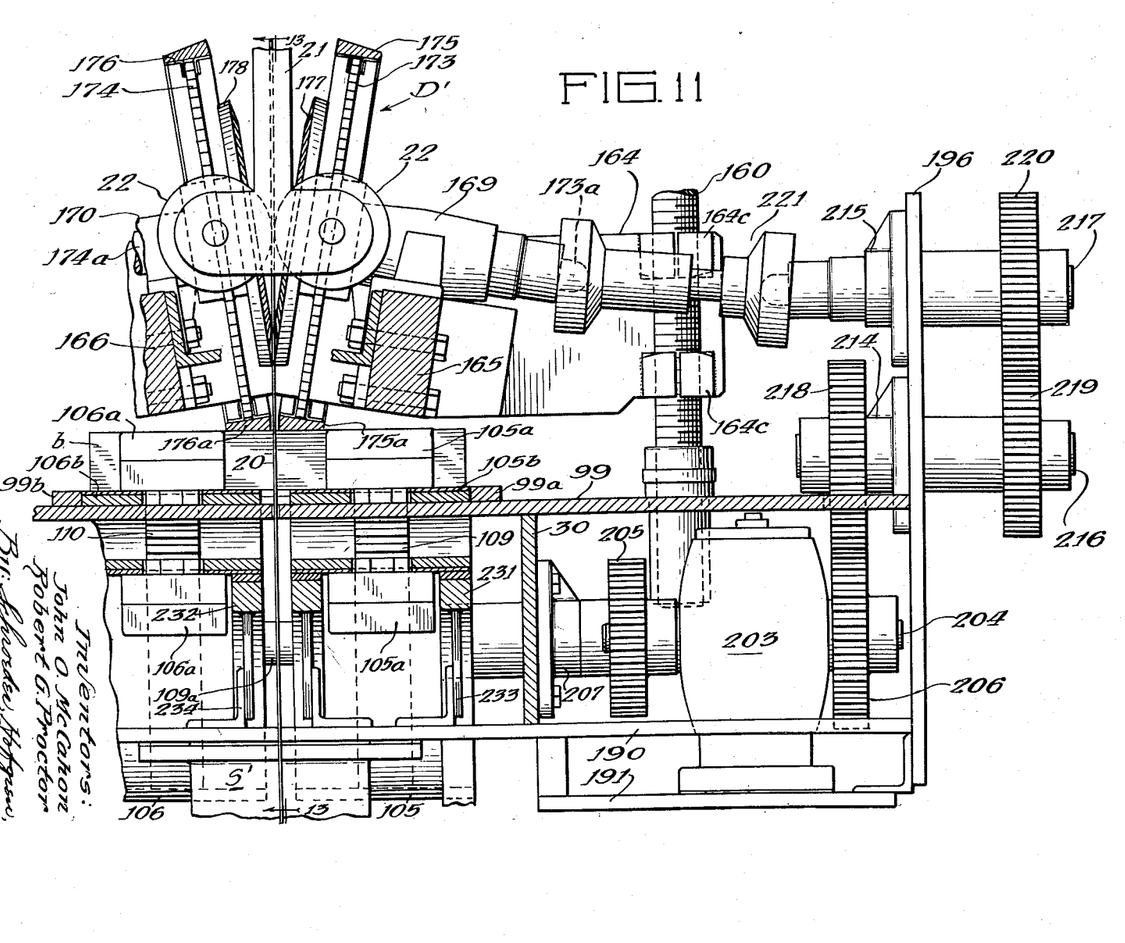
Fig. 11 is a fragmentary section, taken as indicated along the line 11—11 of Fig. 9, showing the right-hand half of the book conveyor which carries the book through the saw.
Figure 12:
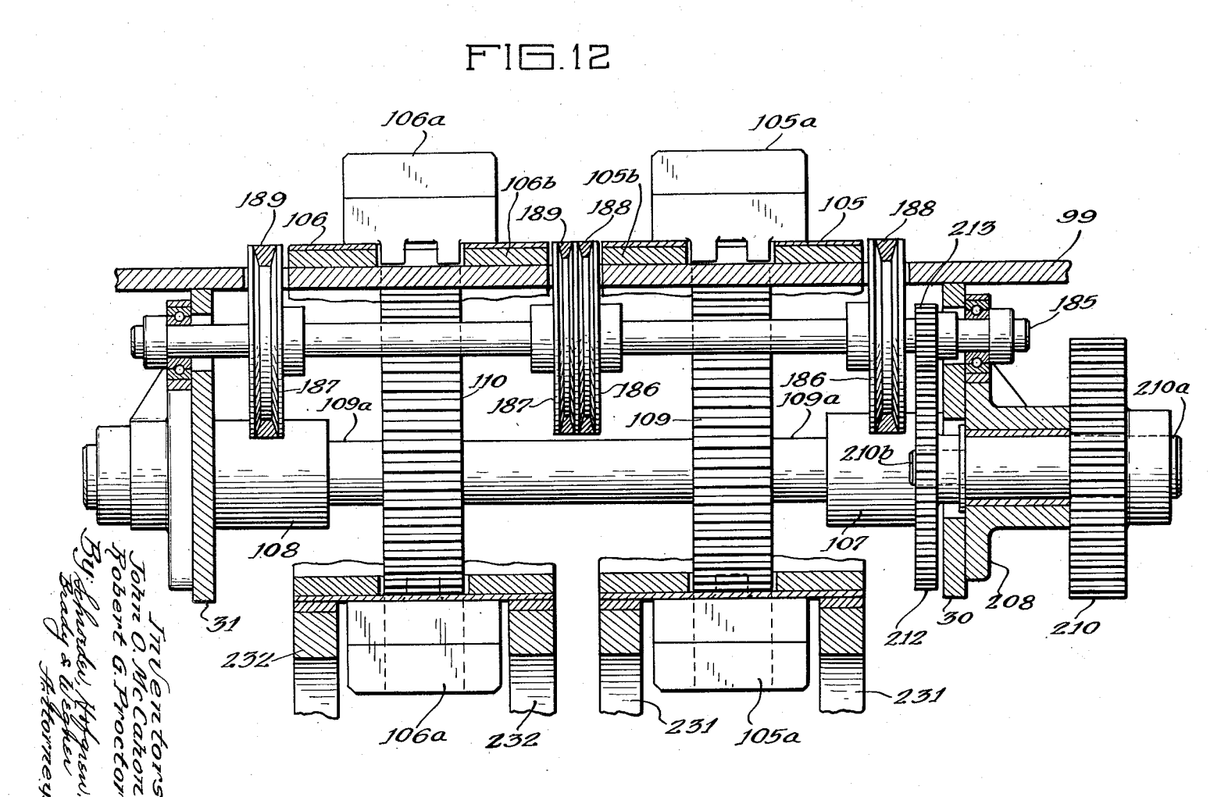
Fig. 12 is a fragmentary section on an enlarged scale, taken as indicated along the line 12—12 of Fig. 9.
Figure 16:
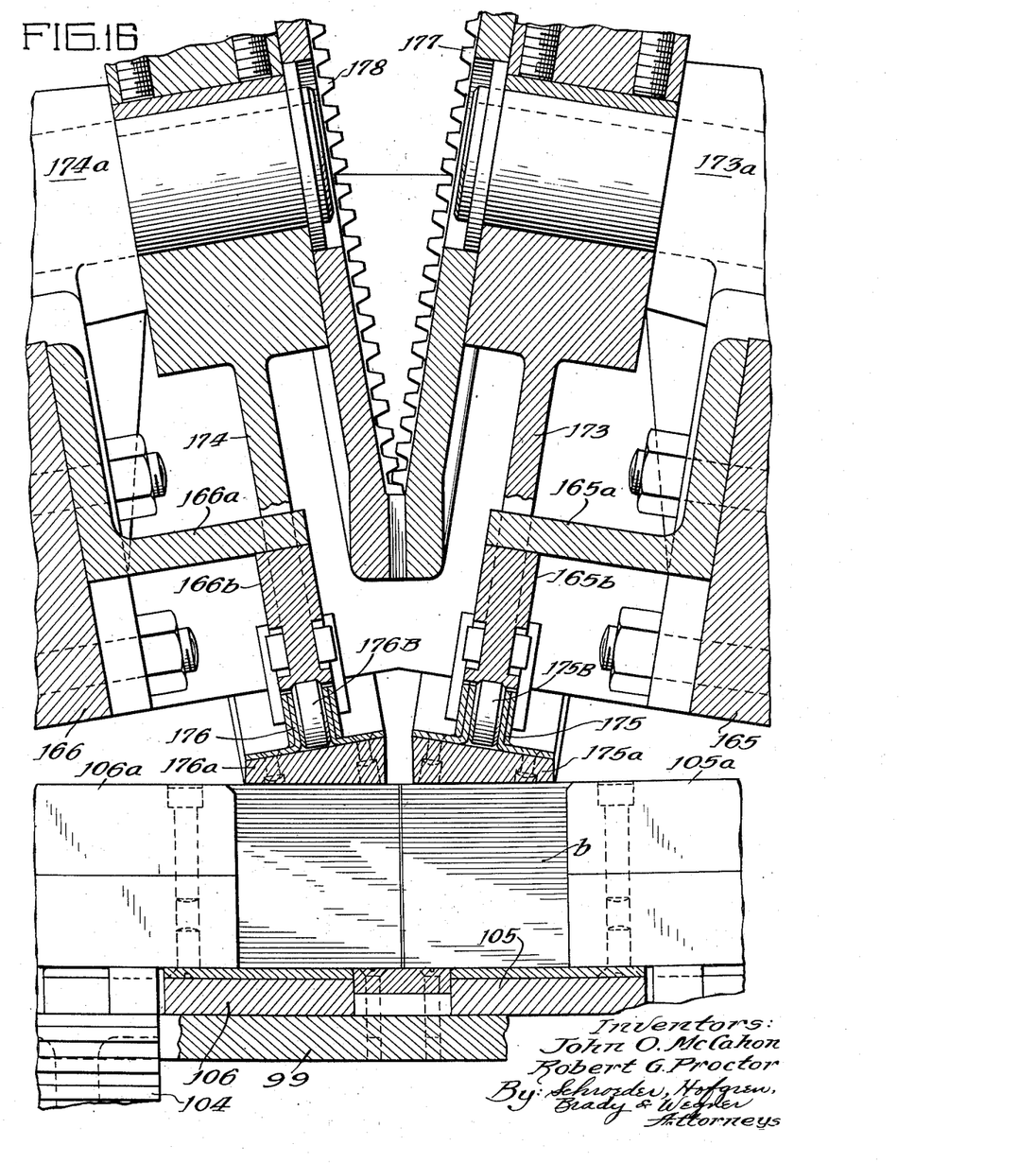
Fig. 16 is an enlarged fragmentary section, taken as indicated along the line 16—16 of Figs. 9 and 14.

Referring now particularly to Figs. 9, 10, 11 to 14 and 16, inclusive, the book hold-down mechanism D–1 includes a bridge frame assembly, indicated generally at 158, which includes jack screws 159, 160, 161 and 162 which are mounted in suitable thrust bearings in the work table 99 so as to extend upwardly from the work table. Nuts 163c on the jack screws 159 and 161, and nuts 164c on the jack screws 160 and 162 respectively support end frames 163 and 164 which, as seen in Figs. 11 and 16, support upwardly diverging longitudinal beams 165 and 166 which are respectively positioned above the lugs 105a and 106a of the book carry-through chain belts 105 and 106. Supported on top of the diverging beams 165 and 166, and at right angles to the plane thereof are front hold-down sprocket bearings 167 and 168 (Figs. 9 and 13) which are in front of the saw blade 20, while behind the saw blade are rear hold-down sprocket bearings 169 and 170 (see Figs. 11 and 16). On front sprocket bearings 167 and 168 are two laterally spaced front sprockets 171 and 172 which have their lower ends very close together between the lugs 105a and 106a on the belts 105 and 106, and which diverge upwardly. As best seen in Figs. 11 and 16, two laterally spaced upwardly diverging rear sprockets 173 and 174 are mounted on shafts 173a and 174a in the bearings 169 and 170, respectively. The sprockets 171 and 173 are in the same plane, and sprockets 172 and 174 are in the same plane. As best seen in Figs. 9, 13, 14 and 16, two book hold-down roller chains 175 and 176 are carried on the sprockets 171—173 and 172—174, respectively, said chains 175 and 176 being provided with closely spaced lugs 175a and 176a which, as best seen in Figs. 11 and 16, have their faces inclined with respect to the axes of the sprockets over which the roller chains run so that the faces of the lugs are horizontal and lie flat upon the books b. Referring now to Fig. 16, close to the saw blade 20 the roller chains 175 and 176 run under adjustable pressure brackets 165a and 166a, respectively; and the rollers 175b and 176b of the chains are pressed down by pressure tracks 165b and 166b. The rear sprockets 173 and 174 are provided, respectively, with bevel gears 177 and 178 on their inner faces which mesh adjacent their lower ends so as to transmit power from one sprocket to tthe other.

As best seen in Figs. 9, 11, 13 and 14, jack screws 159 to 162 for the bridge assembly 158, have worm gears at their upper ends numbered, respectively, 159a, 160a, 161a and 162a; and mounting brackets 159b, 160b, 161b and 162b. Extending between the brackets 159b and 160b is a shaft 179 for worms 159c and 160c which mesh with the gears 159a and 160a. A similar shaft 180 extends between the brackets 161b and 162b and carries worms 161c and 162c which mesh with the gears 161a and 162a. Referring to Fig. 10, a sprocket 181 on the shaft 179 carries a roller chain 182 to mesh with a sprocket 183 on the shaft 180 so that when a handle 179a on the shaft 179 is turned it will rotate the shafts 179 and 180 and all four of the worms and worm gears so as to raise or lower the two end plates 163 and 164 on the jack screws to adjust the hold-down mechanism for books of different thickness.

As seen in Fig. 10, in order to permit the removal of the saw blade, the front plate 163 of the bridge frame is made in two pieces which are connected by a swivel latch bar 163a which is locked in place by a hand lever 163b, so that by turning the lever the plate 163a may be released and swung clear to leave a gap between the two sides of the plate 163 through which the saw blade may be removed.

The outfeed E is similar in construction to the primary feeder A except that since the saw blade is removed forwardly it is not necessary to have separate shafts for the pulleys on the two sides of the machine. Referring to Figs. 1 and 2, the outfeed end of the work table 99 is provided with slots 183 which flank the carry-through chain belts 105 and 106 and a slot 184 between the carry-through chain belts; and a shaft 185 mounted between the beams 30 and 31 supports two right-hand carry-off drive pulleys 186 and two left-hand carry-off drive pulleys 187 which extend into said slots. It is necessary to have four carry-off pulleys and four carry-off belts because the books have been split in two by the saw 20 so that two belts are necessary for each book. The pulleys 186 and 187 are somewhat forward of the sprockets 109 for the book carry-through chain belts 105 and 106, and the drive for the carry-off conveyor E is arranged to drive the conveyor somewhat faster than the carry-through chain belt to pull the books away from the lugs 105a and 106a so that they do not interefere with the downward movement of the lugs as the belts 105 and 106 pass around the sprockets 109 and 110. The outer end portion of the outfeed is not shown in the drawings because it is believed clear to anybody skilled in the art that it would consist of four more pulleys aligned with the pulleys 186 and 187 to carry the outer ends of the outfeed belts 188 and 189.

As best seen in Figs. 9, 10 and 11, all the elements of the unit are driven from the power assembly, indicated generally at P. Secured to the undersides of the beams 30 and 31 beneath the work table 99 is a base member 190 which extends entirely across the work table.

A pair of spaced, longitudinal arcuate belt supports 231 and 232 for the belts 105 and 106, respectively (see Figs. 9, 11 and 12), are mounted on angle members 233 and 234, respectively, on the base member 190. The purpose of the arcuate belt supports is to carry the belts 105 and 106 over the saw pulley 21.

Beneath the base member 190 is hung a motor and gear reducer support 191. A pair of depending posts 192 on the support 191 provide an adjustable mount for an electric motor 193 which has a shaft 194 on which is mounted a drive pulley 195.

Figure 17:
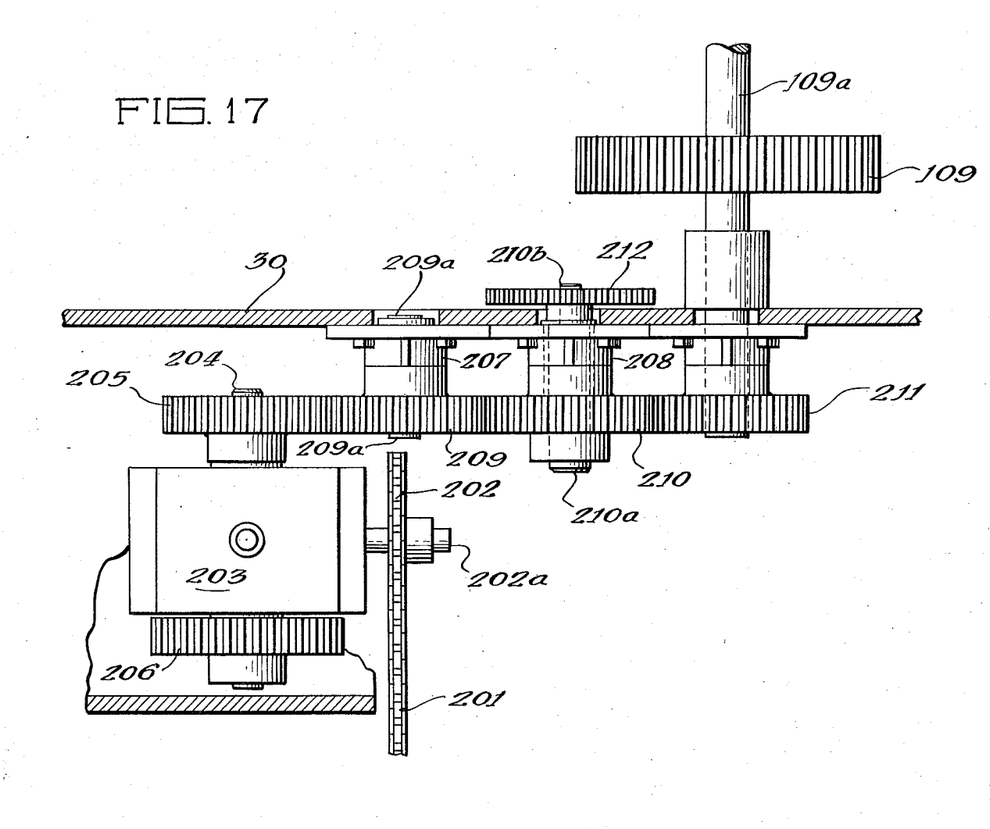
Fig. 17 is a fragmentary section taken as indicated along the line 17—17 of Fig. 9.

As seen in Figs. 9 and 10, extending upwardly from the motor and gear reducer platform 191 alongside table 99 is a side plate 196 which carries pillow blocks 197 for a shaft 197a on which is mounted a large pulley 198 which is connected with the motor drive pulley 195 by means of a belt 199; and a small sprocket 200 on the shaft 197a carries a drive chain 201 which is trained over a sprocket 202 on an input shaft 202a of a gear box 203. The gear box 203 has an output shaft 204 which is mounted at right angles to the input shaft 202a, and extends entirely through the reducer casing so as to carry a drive gear 205 at its inner end adjacent the longitudinal beam 30 and a drive gear 206 at its outer end adjacent the upright outside plate 196. As seen in Fig. 17, between the gear reducer and the shaft 109a for the carry-through conveyor drive members 109 and 110, the beam 30 is provided with a pair of bearing bosses 207 and 208 to accommodate shafts 209a and 210a for gears 209 and 210 which provide a gear train connection between the gear 205 on the speed reducer and a gear 211 on the carry-through conveyor drive shaft 109a. This provides the main power train for the operation of both the carry-through conveyor D and the entire infeed mechanism A—B—C. As best seen in Figs. 12 and 17, the shaft 210a for the gear 210 in the main power train has a reduced inner end portion 210b which extends through an opening in the beam 30 and carries a gear 212 which meshes with a gear 213 on the shaft 185 for the outfeed conveyor pulleys 186 and 187, so as to drive the outfeed. The gearing for the outfeed and for the carry-through conveyor belts is such that the outfeed belts are driven somewhat faster than the carry-through belts so that as the two separate books are picked up by the belts 188 and 189, they are drawn away from the lugs 105a and 106a to avoid interfering with the downward movement of the lugs as chain belts 105 and 106 pass around the sprockets 109 and 110.

As best seen in Figs. 9, 10 and 11, the upright outside plate 196 carries hollow bearing bosses 214 and 215 for shafts 216 and 217 which extend through said plate. The shaft 216 has a gear 218 on its inner end which meshes with the second drive gear 206 on the speed reducer shaft 204, and a gear 219 at its outer end which meshes with a gear 220 on the shaft 217. The inner end of the shaft 217 connects with a universal joint drive 221 for the shaft 173a of the book hold-down sprocket 173. The universal joint drive is necessary, of course, to permit the vertical adjustment of the book hold-down mechanism D-1 to accommodate books of different thicknesses.

Figure 13:
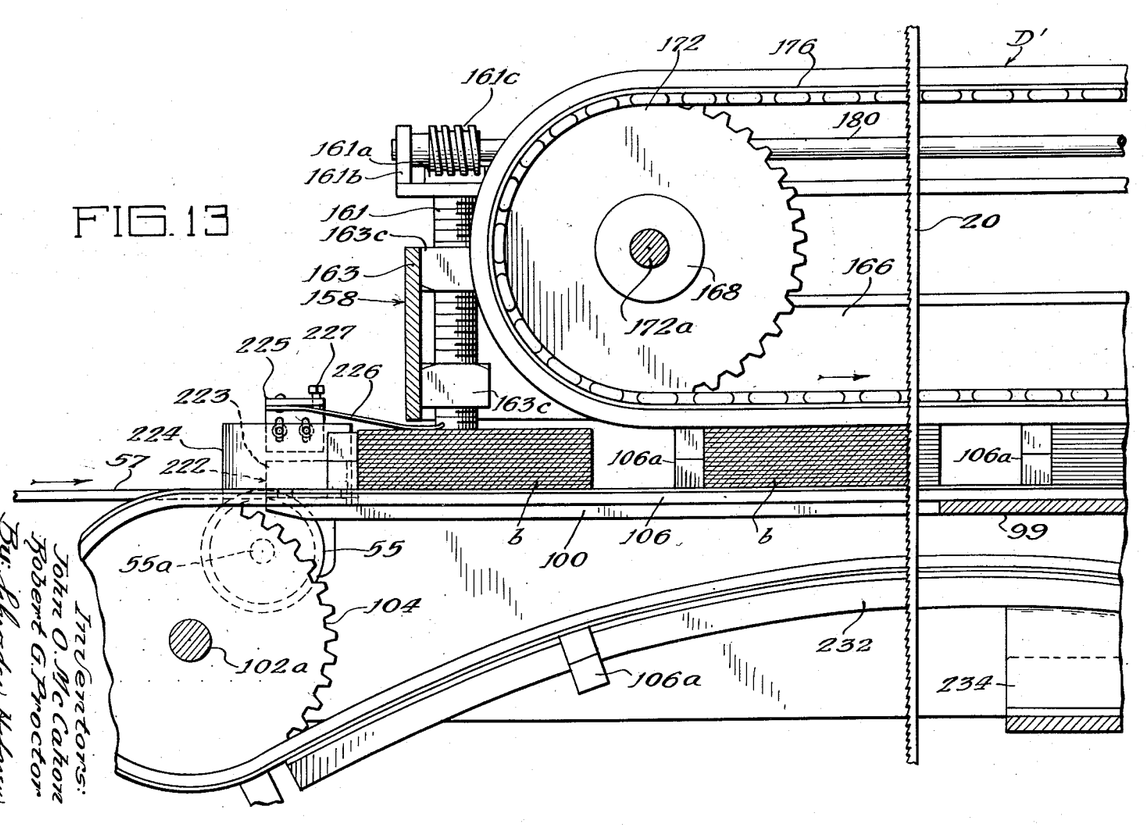
Figs. 13 and 14 are enlarged fragmentary sections, taken as indicated along the line 13—13 of Fig. 11.
Figure 14:
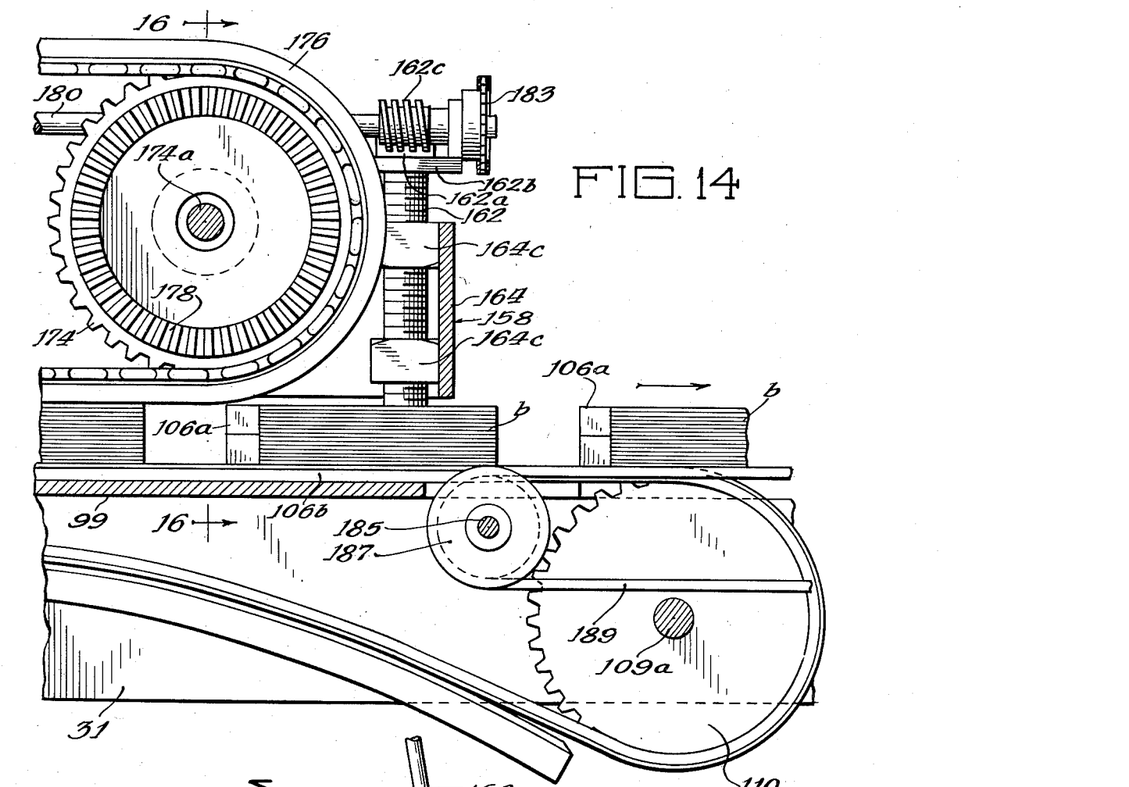

Referring now to Figs. 10 and 13, on the work table 99 just forward of the front cross member 163 of the bridge frame assembly 158 is a book guide and retarded mechanism, one-half of which is shown in side elevation in Fig. 13 and the other half of which is shown in front elevation in Fig. 10. The two halves are identical, and will be given the same numbers. Each half of the guide and retarder includes an angle bracket 222 monuted on the work table 99 for lateral sliding adjustment and having on its upright inner face 223 a book side guide 224 which is flared at its forward end so that if a book is slightly out of line it will be moved to a correct lateral position with respect to the saw by the side guides 224. Secured to the upper end of the side guide 224 is a vertically adjustable overhanging bracket 225. Extending downwardly and rearwardly from the bracket 225 is a leaf spring 226, the tension of which may be adjusted by a set screw 227 in the bracket 225. The spring 226 rides on top of the books passing under it so as to retard the books slightly and permit the lugs 105a and 106a on the book carry-through chain belts 105 and 106 to catch up with the book so that there is no slippage of a book on the belt when it first encounters the saw blade 20.

Referring to Fig. 9, mounted on the front cross member 163 of the bridge frame 158 is a pivotally adjustable arm 228 on the end of which is a microswitch 230 having a switch rider member 229 which is spaced above the lugs 105a. The microswitch is wired into an electric circuit (not shown) which includes the main switch for the electric motor 193. Slight mistiming of the book forwarding conveyor C with respect to the book carry-through conveyors D may accidentally take place so that the lugs 105a and 106a come up underneath a book; and if this happens the book will strike the microswitch rider 229 to open the motor circuit and stop the machine before the book is jammed into the front cross plate 163 of the bridge frame.

The operation of the machine is believed to be obvious from the foregoing description. Double books b roll down the gravity conveyor G onto the primary conveyor A, and are stopped by the reciprocating stop fingers 90 and 91 of the stop mechanism B, and the front end of the double book held by the stop fingers 90 and 91 is on the front of the forwarding conveyor belts C which travel substantially faster than the primary conveyor A. The book forwarding roller assembly 58 may rock downwardly in timed relationship to the movement of the stop fingers 90 and 91 to their depressed, or released position, and these operations are coordinated with the movement of the carry-through conveyor D in such a way that a book b is delivered by the forwarding mechanism onto the carry-through chain belts 105 and 106 immediately behind a pair of the belt lugs 105a and 106a, as seen in Fig. 2. The double book b moves between the side guides 224 of the book guide and retarded mechanism, and the frictional drag of the leaf springs 226 retards the double book on the belts 105 and 106 until the lugs 105a and 106a which are behind the book catch up with it and carry it forward underneath the hold-down mechanism D–1. As seen in Figs. 11 and 16, the hold-down roller chains 175 and 176, running beneath the adjustable pressure brackets 165a and 166a hold the double book firmly on the belts 105 and 106 and compress its pages into a compact mass as it is cut into two parts by the saw blade 20 of the band saw S. The carry-through conveyor chain belts 105 and 106 take the two books which have been cut by the band saw to the outfeed conveyor E which is driven at a higher speed than the carry-through belts, so that the books are moved away from the lugs 105a and 106a before the lugs start downwardly around the fluted drive sprockets 109 and 110. The book forwarding roller mechanism 58 may be vertically adjusted to accommodate books of different thicknesses, as may also the book hold-down mechanism D–1. The book guide and retarder mechanism may be adjusted for double books of different widths by sliding the angle brackets 222 laterally on the work table 99.

The foregoing detailed description is given for clearness of understanding only and no unnecessary limitations are to be understood therefrom, as some modifications will be obvious to those skilled in the art.

We claim:

1. A double book feeding mechanism for a band saw having a base and a band saw blade, comprising: a frame secured to the band saw blade, said frame including a work table with a slot for the band saw blade; driven infeed means at the side of said frame ahead of the saw; driven carry-through conveyor means having sprocket means supporting a pair of conveyor belts flanking the slot, said belts having transversely aligned upstanding sets of longitudinally spaced lugs to carry double books seriatim to be cut in two by the saw; vertically adjustable means driven in the same direction and at the same speed as said conveyor means for firmly holding down a book as it is sawed to compress its pages; and a pair of driven parallel carry-off conveyors behind the saw which operate at higher speed than said carry-through conveyor belts, said carry-off conveyors including pulleys between the carry-through belts so that the carry-off conveyors may engage the books to draw them away from the upstanding lugs on the carry-through belts before said lugs tilt as the belts travel around the sprocket means.

2. A double book feeding mechanism for a band saw having a base and a band saw blade, comprising: a frame secured to the band saw base, said frame including a work table with a slot for the band saw blade; driven infeed means at the side of said frame ahead of the saw; a pair of parallel, driven carry-through conveyor belts closely flanking the slot and extending past both sides of the saw blade, each of said belts having a smooth planar surface underlying most of one-half of the double book so that said two belts fully support the double book during a sawing operation; transversely aligned, longitudinally spaced lugs on said belts to push double books seriatim through a sawing operation; a bridge frame spanning said conveyor belts; vertically adjustable mounting means on said bridge frame; smooth surfaced book compressing means carried by said mounting means, said compressing means having very slightly spaced bearing means closely flanking the plane of the saw blade and extending continuously to front and rear of the blade overlying the adjacent portions of the conveyor belts; means for driving said bearing means continuously in the same direction and at the same speed as said conveyor belts; and pressure means forcing the bearing means firmly against the books adjacent the saw blade, whereby the pages of each book are compressed between the bearing means and the belts into a compact mass during the sawing operation.

3. The device of claim 2 in which the bearing means includes a pair of longitudinally aligned sprockets on each side of the plane of the blade with the sprockets of each pair aligned ahead of and behind the blade, and a flat surfaced roller chain on each pair of sprockets which has closely spaced bearing blocks.

4. A double book feeding mechanism for a band saw having a base, an overhanging band saw head provided with depending closely spaced guide rollers, and a band saw running between said guide rollers, comprising: a frame secured to the band saw base, said frame including a work table a short distance below the guide rollers with a slot for the band saw blade; driven infeed means at the side of said frame ahead of the saw; a pair of driven carry-through conveyor belts closely flanking the slot and extending past both sides of the saw blade, each of said belts having a smooth planar surface underlying most of one-half of the double book so that said two belts fully support the double book during a sawing operation; transversely aligned, longitudinally spaced lugs on said belts to push double books seriatim through a sawing operation; a bridge frame spanning the conveyor belts; vertically adjustable mounting means on said bridge frame; two laterally spaced, upwardly diverging front sprockets journalled in said mounting means flanking the plane of the slot ahead of the saw blade, the lowest portions of said sprockets being very close to said plane; two laterally spaced rear sprockets journalled in the mounting means behind the saw blade each of which is coplanar with one of said front sprockets; a roller chain on each pair of coplanar sprockets, overlying the adjacent portion of conveyor belt, each said chain having closely spaced, smooth surfaced bearing blocks provided with faces which are inclined to the plane of the sprockets so as to ride flat on that part of a double book on one side of the saw blade; means for driving said sprockets so that the bearing blocks travel in the same direction and at the same speed as said conveyor belts; and pressure means forcing the bearing blocks firmly against the books adjacent the saw blade, whereby the pages of each book are compressed between the bearing blocks and the conveyor belts during the sawing operation.

5. The device of claim 4 in which the pressure means includes adjustable members having trackways to bear on the roller chains.

6. A double book feeding mechanism for a band saw having a base and a band saw blade, comprising: a frame secured to the band saw base, said frame including a work table with a slot for the band saw blade which extends to the front of the table; driven infeed means at the side of said frame ahead of the saw; a pair of parallel driven carry-through conveyor belts closely flanking the slot, said belts having transversely aligned, longitudinally spaced lugs to carry double books seriatim through a sawing operation; a bridge frame spanning the conveyor belts; vertically adjustable mounting means on said bridge frame; two laterally spaced front sprockets journalled in said mounting means closely flanking the vertical plane of the slot ahead of the saw blade, said front sprockets being unconnected to permit removal of the saw blade through the slot; two laterally spaced rear sprockets journalled in the mounting means behind the saw blade each of which is coplanar with one of said front sprockets; meshing gears on said rear sprockets; a roller chain on each pair of coplanar sprockets, each said chain having closely spaced smooth surfaced bearing blocks to ride on that part of a double book on one side of the saw blade; pressure means forcing the bearing blocks firmly against the books adjacent the saw blade; and a universal joint drive connected to one rear sprocket for driving all said sprockets so that the bearing blocks travel in the same direction and at the same speed as said conveyor belts, whereby the bearing blocks compress the pages of a book as it is sawed.

7. A double book feeding mechanism for a band saw having a base and a band saw blade, comprising: a frame secured to the band saw base, said frame including a work table with a slot for the band saw blade; constantly moving primary conveyor means forward of the frame for carrying double books relatively slowly toward the work table in random relationship; single stop means mounted at the inner end of said primary conveyor means to hold books stationary on the moving primary conveyor means; forwarding conveyor means partially overlapping and operating at a higher speed than the primary conveyor means, said forwarding conveyor means including driven means cyclically movable into engagement with a double book to forward said book from the primary conveyor means; cyclically operating means for retracting said stop means to release a book for travel with the forwarding conveyor means simultaneously with engagement of the book by the driven means and form a gap between said book and the next succeeding book, and for projecting said stop means into said gap, whereby said books are spaced substantially uniformly after leaving the stop means; and conveyor means for positively moving said double books in a predetermined spaced relationship to be cut in two by the saw.

8. A double book feeding mechanism for a band saw having a base and a band saw blade, comprising: a frame secured to the band saw base, said frame including a work table with a slot for the band saw blade; constantly moving primary conveyor means forward of the frame for carrying double books relatively slowly toward the work table in random relationship; transversely aligned rocking stop fingers projecting upwardly into the path of the double books at the inner end of said primary conveyor means to hold books stationary on the moving primary conveyor means; forwarding conveyor means partially overlapping and operating at a higher speed than the primary conveyor means, said forwarding conveyor means including driven means cyclically movable into engagement with a double book to forward said book from the primary conveyor means; spring means urging the fingers up; cyclically operating means for rocking the fingers down against the urging of the spring means to release a book for travel with the forwarding conveyor means simultaneously with engagement of the book by the driven means and form a gap between said book and the next succeeding book, said means being timed to release the fingers for upward movement into said gap, whereby said books are spaced substantially uniformly as they leave the stop fingers; and conveyor means for positively moving said double books in predetermined spaced relationship to be cut in two by the saw.

9. A double book feeding mechanism for a band saw having a base and a band saw blade, comprising: a frame secured to the band saw base, said frame including a work table with a slot for the band saw blade; constantly moving primary conveyor means forward of the frame for carrying double books relatively slowly toward the work table in random relationship; single stop means mounted at the inner end of said primary conveyor means to hold books stationary on the moving primary conveyor means; forwarding conveyor means operating at higher speed than the primary conveyor means, said forwarding conveyor means including driven book forwarding roller means on movable arms above the stop means which move down intermittently to positively engage and forward a double book from the primary conveyor means; means operating in timed relationship with the downward movement of said arms for retracting the stop means to release a book for travel with said roller means and form a gap between said book and the next succeeding book, and for projecting the stop means into said gap, whereby the books are spaced substantially uniformly as they leave the stop means; and conveyor means for positively moving said double books in predetermined spaced relationship to be cut in two by the saw.

10. A double book feeding mechanism for a band saw having a base and a band saw blade, comprising: a frame secured to the band saw base, said frame including a work table with a slot for the band saw blade; constantly moving primary conveyor means forward of the frame for carrying double books relatively slowly toward the work table in random relationship; laterally aligned rocking stop fingers projecting upwardly into the path of the double books at the inner end of said primary conveyor means to hold books stationary on the moving primary conveyor means; forwarding conveyor means operating at higher speed than the primary conveyor means, said forwarding conveyor means including driven book forwarding roller means on movable arms above the stop means which move down intermittently to positively engage and forward a double book from the primary conveyor means; spring means urging the fingers up; means operating in timed relationship with the downward movement of said arms for rocking the fingers down against the urging of the spring means to release a book for travel with said roller means and form a gap between said book and the next succeeding book, and to release the fingers for upward movement into said gap, whereby said books are spaced substantially uniformly after leaving the stop means; and conveyor means for positively moving said double books in predetermined spaced relationship to be cut in two by the saw.

References Cited in the file of this patent

UNITED STATES PATENTS

| | | |
|---|---|---|
| 398,048 | Hutchinson et al. | Feb. 19, 1889 |
| 877,124 | Robinson et al. | Jan. 21, 1908 |
| 1,736,641 | Zimmerman | Nov. 19, 1929 |
| 1,795,137 | Nye | Mar. 3, 1931 |
| 1,849,045 | Wolf | Mar. 8, 1932 |
| 1,856,169 | Rosener et al. | May 3, 1932 |
| 1,870,555 | Burton | Aug. 9, 1932 |
| 1,934,087 | Payzant et al. | Nov. 7, 1933 |
| 2,403,673 | Mead | July 9, 1946 |
| 2,616,501 | Smith | Nov. 4, 1952 |

FOREIGN PATENTS

| | | |
|---|---|---|
| 771,668 | France | July 30, 1934 |